March 9, 1948.    C. W. CRUMRINE    2,437,507
ANIMAL TRAP
Filed Dec. 17, 1942

INVENTOR
Chester W Crumrine
BY
Bean, Brooks, Buckley & Bean
ATTORNEYS

Patented Mar. 9, 1948

2,437,507

UNITED STATES PATENT OFFICE 2,437,507

ANIMAL TRAP

Chester W. Crumrine, Irondquoit Township, Monroe County, N. Y., assignor, by mesne assignments, to L F C Corporation, Rochester, N. Y., a corporation of New York Application December 17, 1942, Serial No. 469,309

8 Claims. (Cl. 43—74)

This invention relates to animal traps and particularly to automatic traps which are especially useful in the extermination of rodents.

In another application for Letters Patent filed concurrently herewith and bearing Serial No. 469,308 filed December 17, 1942, the present applicant discloses an animal trap whose broad principles are similar to those of the present application. In both cases trap means are provided wherein there is an unobstructed trap zone and the mere presence of an animal therein initiates a cycle of operation which includes positively and forcibly moving the animal to a confined area where it is electrocuted, following which the body of the animal is automatically moved from the electrocution area to free the same for subsequent electrocution of another animal. In both cases, movement of the animal body to the electrocution area is immediately followed by return of the animal-moving means to initial position to condition the moving means for forcibly moving another animal to the electrocution area upon entry of such other animal into the trapping zone.

In both the present application and the other application referred to above, the cycle of operation is short in duration and the complete cycles of disposition of animals may overlap to some extent. The efficiency of trapping devices constructed according to the present invention is very high and conditions in highly infested areas may be satisfactorily dealt with.

In the exemplary form of the present invention shown in the accompanying drawing and described in the ensuing specification, light sensitive means are provided for initiating the trapping and disposing cycle and the general relationship of the light sensitive means and the electrical means for moving and electrocuting the animal are similar to those set forth in detail in the aforesaid other application.

In the construction shown and described herein more complex animal-moving means are provided but the greater complexity is offset by the fact that a very much larger trapping zone may be established and adequately dealt with. To this end the present construction contemplates plural cooperating animal-moving means and in the illustrated form a swinging member swings from one side of a relatively wide animal passage to a point partway across the passage where it is met by a second movable member which has swung from the opposite side of the passage. In the present instance the first movable member stops at this point while the second movable member continues to move the animal upwardly to the entrance portion of an electrocution space or chamber.

Since each of the animal-moving elements must cover only a part of the trapping zone a larger trapping zone may be employed while still providing for the covering of the entire trapping zone by the moving means in a period of time short enough to eliminate any possibility of escape of the animal. Removal of the animal from the unobstructed trapping zone is substantially instantaneous.

While specific details of the construction are shown in the drawing and described herein by way of example, it is to be understood that the spirit and scope of the invention are not limited hereto or otherwise than as defined in the appended claims.

Figure 1:
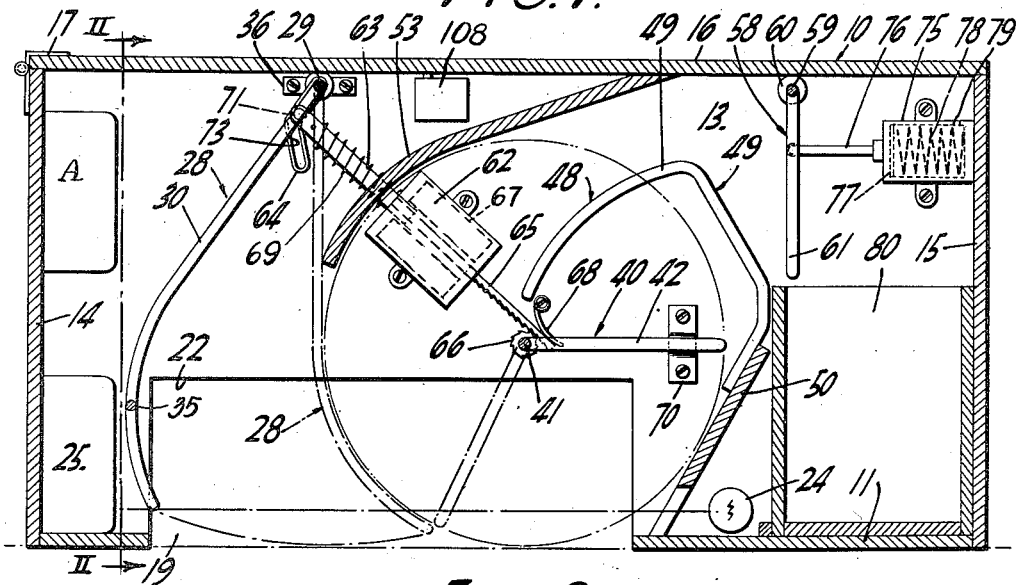
Fig. 1 is a cross sectional view on the line I—I of Fig. 2.

Throughout the several figures of the drawing, like characters of reference denote like parts and the numeral 10 designates generally a box-like casing having a bottom wall, 11; front and rear walls 12 and 13, respectively; side walls 14 and 15; and a top closure wall 16 hinged to the side wall 14 as at 17. It will be noted that a portion of the bottom wall 11 is broken away to form a passageway 19, Fig. 1, and this clear, wide passageway extends entirely from the front wall 12 to the rear wall 13, there being entrance ways formed in these two walls at each end of the passageway 19. The entranceways in the walls 12 and 13 are designated 21 and 22, respectively, and cooperate with the passageway 19 to provide a clear and uninterrupted zone which, in the illustrated embodiment, forms a mere continuation of the floor or other surface upon which the trap may be resting. It is during the free passage of an animal through this zone that its freedom is abruptly arrested and the entire trapping and disposing cycle is begun and automatically continued to completion.

A light source is designated 24 and rays therefrom are projected across the passageway 19 where they are received by a photoelectric cell (not shown) which forms a part of a photoelectric relay unit designated 25 in Fig. 1. As is stated in the companion application Serial No. 469,308, units of this kind are available commercially and accordingly the details need not be shown. In the present instance the relay will be so connected that failure or interruption of the light beam from the source 24 momentarily closes a micro-switch associated with the relay 25. Movement of an animal across the light beam accordingly energizes circuits associated with the micro-switch, and, as will appear from the following, means are thereby actuated to move the animal from the open passageway 19 to a confined position in the casing 10.

The numeral 28 designates generally one of the animal-moving elements and this element comprises a pivot rod 29 having a plurality of bars or tines 30 depending therefrom. If desired, although not necessarily, the element 28 may be reinforced by the presence of bars 33 and 34 which connect the bottom ends of the several depending bars 30. A bar portion 35 is offset upwardly from the bottom bars 33 and 34 to avoid interference with the light beam from the source 24 in its passage to the light sensitive means.

The pivot rod 29 of the element 28 may be suitably journaled in a pair of bearings 36 which in the illustrated instance are secured against the front and rear walls 12 and 13 respectively. Merely for clearness of description, the element 28 will be referred to hereinafter as the primary animal-moving element, and a cooperating animal-moving element about to be described will be referred to as a secondary animal-moving element. It is to be borne in mind, however, that this terminology does not require that the two elements move the animal in any particular sequence. As will appear, the so-called secondary animal-moving element may in fact be the first to engage the body of an animal and move it.

Figure 2:
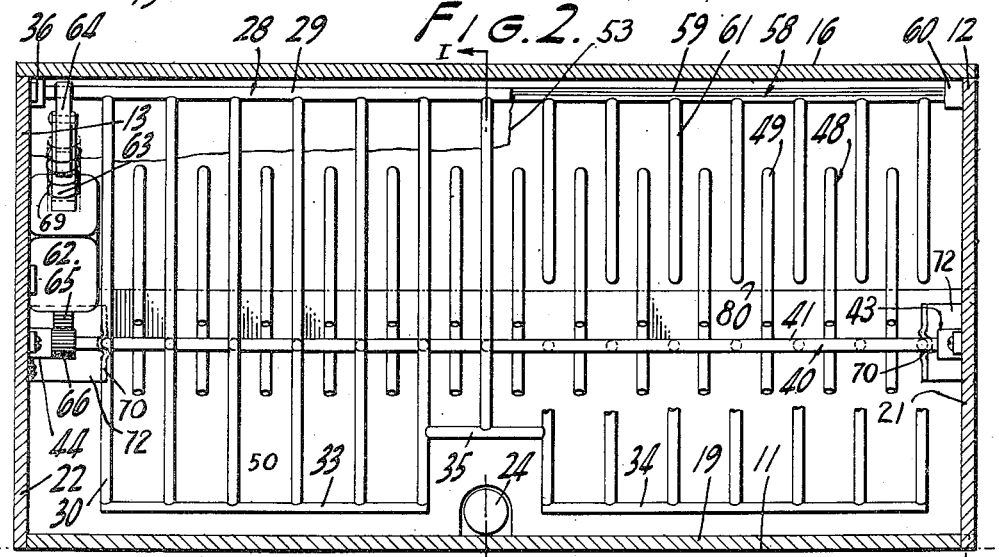
Fig. 2 is a cross-sectional view of the device taken on the line II—II of Fig. 1, with parts broken away for added clearness.

A secondary animal-moving element is designated generally 40 in Figs. 1 and 2 and comprises a pivot rod 41 having a plurality of spaced parallel tines 42 projecting perpendicularly therefrom. The pivot rod 41, like that of the element 28, may be provided with bearings 43 and 44 carried by the front and rear walls, respectively, of the casing.

Movement of the elements 28 and 40 in the operation of positively removing an animal body from the passageway 19 proceeds in the following manner. The element 28 and the element 40 may begin rotation simultaneously, the former in a counterclockwise direction and the latter in a clockwise direction, and their rotation is so timed that they reach the dot and dash line positions of Fig. 1 simultaneously. The animal is at that time confined between the elements 28 and 40. At this time the primary element 28 ceases rotation but the secondary element 40 continues uninterruptedly to complete a full rotation of 360° to its original position. In so doing it passes what is in effect a ramp element 48 which comprises a series of parallel rods or tines 49, each secured at one end to a mounting board 50 which extends the full length of casing 10 and is secured at its ends to the interior surfaces of the front and rear walls 12 and 13. The tines 49 are staggered with respect to the tines 42 of the secondary element 40 to permit the latter to pass the ramp 48 freely in its rotative movement.

When the element 40 passes from the arcuate portion of the primary element 28 it reaches a curved wall 53 secured at its ends to the front and rear walls of the casing. The wall 53 confines the animal body to movement with the element 40 until it is directed therefrom by engagement with the ramp 48. Centrifugal force causes the animal body to move over the crest of the ramp 48 to an electrocution compartment formed by the median portions of the tines 49 and a pivoted retaining means designated generally 58.

The retaining means 58 comprises a pivot bar 59 journaled in bearings 60 secured to the front and rear walls of the casing. The pivot bar 59 has a plurality of depending tines or bars 61 secured perpendicularly thereto form a wall portion.

Various means may be employed to actuate the primary and secondary animal-moving elements 28 and 40 in their proper timed relationship. In the exemplary form illustrated in the drawing an electromagnet 62 is so disposed that its armature 63 may be extended to pivotally engage an operator 64 fixed to the pivot rod 29 of the primary element 28. An annular winding 67 for the electromagnet is shown in dotted lines in Fig. 1. The opposite end of the armature 63 has fixed thereto a rack element 65 which has ratchet teeth for engagement with a ratchet wheel 66 fixed to the pivot bar 41 of the secondary element 40. A spring leaf 68 may be provided for maintaining resilient engagement between the rack 65 and the ratchet wheel 66 so that the rack 65 can rotate the ratchet wheel 66 only in a clockwise direction.

The armature 63 is normally biased to an upper left-hand position as viewed in Fig. 1 by a compression spring 69 which has one end fixed to armature 63 and its other end seating against electromagnet 62. When the electromagnet 62 is energized, the armature 63 is urged in a direction toward the secondary moving means 40. The relative sizes of the parts are such that this movement imparts a single full rotation to the secondary moving means 40 which accordingly returns to its initial position where it is resiliently retained by resilient detents 70. The detents 70 comprise flat plates secured against blocks 72 which are in turn rigidly fastened to front and rear walls 12 and 13 as appears in Fig. 2. Each plate 70 has a pair of parallel ridges which provide a detent for receiving and resiliently retaining the end tines 42 therebetween.

Figure 3:
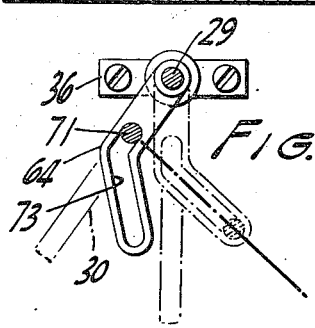
Fig. 3 is a detail view of an operator for the primary animal-moving means viewed as in Fig. 1 but on an enlarged scale.

During movement of the armature 63 under the urge of the electromagnet 62 a pivot pin 71 carried by the extended end of the armature 63 engages a slot 73 formed in the operator 64 which is secured to the pivot bar of the primary moving means. This slot is so formed and proportioned that the initial movement of the armature 63 moves the operator 64, and accordingly the primary moving means 28, to the dot and dash line position of Fig. 3. This corresponds to the dot and dash line position of the primary element 28 shown in Fig. 1, and this position is reached at the time when rotation of the secondary means 40 has just reached the dot and dash line position of Fig. 1.

Continued movement of the armature 63 does not change the position of the operator 64 or the moving means 28, since the pin 71 rides in the portion of the slot which is then coincident with the direction of movement of the armature 63. During this time the pin 71 does serve to prevent return movement of the primary moving element 28 through engagement of the upper right hand side of the pin 71 with the wall of the slot 73. Return movement of the primary moving means 28 is effected upon de-energization of the electromagnet 62 and consequent return movement of the armature 63. During such return movement the teeth of the rack 65 ride idly over the periphery of the ratchet wheel 66 and the position of the secondary moving means 40 is not disturbed.

Figure 4:
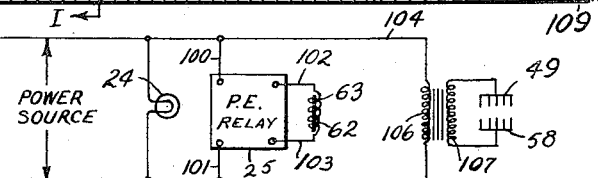
Fig. 4 is a diagram of the electrical circuit connections or wiring.

As previously stated, the medial portions of the tines 49 of the ramp 48 cooperate with the tines 61 of the swinging member 58 to form an electrocuting compartment. The electrical relationship between the photoelectric relay 25, the operating electromagnet 62, and the electrocuting circuit is shown diagrammatically in Fig. 4 of the drawings. In the particular exemplification of the invention illustrated, the tines 49 are electrically connected to form a single electrode, the tines 61 of the retaining means 58 being the opposite electrode. The mounting board 50 forms suitable insulation for the tines 49. The retaining means 58 is provided with an insulating mounting of conventional form (not shown). Referring to Fig. 4 of the drawings, 100 and 101 designate input leads for the conventional photoelectric relay 25, and 102 and 103 are output leads from the relay connected with the electromagnet 62 so that the electromagnet will be energized when the beam from the lamp 24 to the relay 25 is interrupted. The circuit includes parallel conductors 104 and 105, and included in the circuit is a primary transformer winding 106 of a transformer designated generally A in Fig. 1, the secondary winding 107 of the transformer being connected with the electrodes 49 and 58 as generally disclosed in my application, Ser. No. 469,308, filed December 17, 1942. Also included in the circuit is a cover operated switch 108 that may be of the same construction as the cover operated switch disclosed in my application, Ser. No. 469,308. The electrode 58 is connected in the circuit by a suitable flexible electrical wire connection of conventional form (not shown), the same being secured to the pivot bar 59.

In the other application for Letters Patent referred to above, Ser. No. 469,308, movement of the member corresponding to the swinging member 58, to release an animal after electrocution, is effected electrically. In the present instance this portion of the electrical part of the device is supplanted by the provision of a conventional dashpot 75 whose piston rod 76 connects with the swinging member 58, the piston 77 thereof being biased to the position shown in Fig. 1 by a relatively light compression spring 78. A vent for the dash pot is designated 79 in Fig. 1. The weight of an animal will move the swinging member 58 to the right as viewed in Fig. 1 and the delaying action of the dashpot 75 is so proportioned as to allow time for certain electrocution of the animal before it drops from the electrocuting chamber to a lower portion of the trap where a box or drawer 80 may be provided for receiving animal bodies. The drawer 80 may be removed through a suitable opening 109 in the front wall 12 and for convenience the adjacent end of drawer 80 may comprise the closure for the wall opening although this detail forms no part of the present invention.

What is claimed is:

1. An animal trap comprising an unobstructed longitudinal passageway, means adjacent said passageway at one side thereof and movable partly thereacross to impel an animal in its path, other means adjacent said passageway at the other side thereof and movable to traverse the remainder of said passageway by movement toward said first means to impel an animal in its path to a predetermined zone between said two means, and a casing portion adjacent said passageway, one of said means being further movable to said casing portion to propel into said casing portion an animal impelled to said predetermined zone by either of said means.

2. An animal trap comprising an unobstructed longitudinal passageway having an arcuate portion, means adjacent said passageway and movable partly thereacross to impel an animal to the arcuate portion of said passageway, a casing adjacent the arcuate portion of said passageway, and rotatable means disposed concentrically of said arcuate portion with its axis horizontal and parallel to the extent of said passageway for traversing said arcuate portion and propelling an animal into said casing.

3. An animal trap comprising an unobstructed longitudinal passageway having a longitudinally extending arcuate portion with an entrance, means adjacent said passageway at one side thereof and movable partly thereacross to impel an animal to the arcuate portion of said passageway, a casing having an entrance above the entrance to the arcuate portion of said passageway, and rotatable means disposed concentrically of said arcuate portion with its axis lengthwise of said passageway for traversing said arcuate portion and propelling an animal upwardly into said casing.

4. An animal trap comprising an unobstructed longitudinal passageway having a longitudinally extending arcuate portion, means adjacent said passageway at one side thereof and movable partly thereacross to impel an animal to the arcuate portion of said passageway, a casing portion adjacent the arcuate portion of said passageway, rotatable means disposed concentrically of said arcuate portion with its axis lengthwise of said passageway for traversing said arcuate portion and propelling an animal into said casing portion, and means in said casing portion for stripping the animal body from the rotatable means.

5. An animal trap comprising an unobstructed longitudinal passageway, means adjacent said passageway and movable partly thereacross to impel an animal in its path, other means adjacent said passageway at the opposite side thereof and rotatable toward said first means about a horizontal axis parallel to said passageway to traverse the remainder of said passageway to impel an animal in its path, a casing portion adjacent said passageway, one of said means being movable to said casing portion to propel into said casing portion an animal initially impelled by either of said means, and drive means for said rotatable means, said drive means continuing rotation of the rotatable means to starting position after the animal is propelled in the casing.

6. An animal trap comprising an unobstructed longitudinal passageway having an arcuate portion, means adjacent said passageway and mounted for swinging movement partly thereacross to impel an animal to the arcuate portion of said passageway, a casing adjacent the arcuate portion of said passageway, and rotatable means disposed concentrically with respect to said arcuate passage portion and with its axis horizontal and parallel to said passageway for traversing said arcuate portion and propelling an animal into said casing.

7. An animal trap comprising an unobstructed longitudinal passageway having an arcuate portion, means adjacent said passageway and movable partly thereacross, said means being curved to impel an animal to the arcuate portion of said passageway, a casing adjacent the arcuate portion of said passageway, and rotatable means disposed concentrically with respect to said arcuate passage portion with its axis horizontal and parallel to said passageway for traversing said arcuate portion and propelling an animal into said casing.

8. An animal trap comprising an unobstructed passageway, means adjacent said passageway and movable partly thereacross to traverse a portion of said passageway, other means adjacent said passageway movable to traverse the remainder of said passageway by movement toward said first means to confine an animal to a predetermined zone, and a casing having an entrance portion above said passageway, one of said means being further movable upwardly to said casing to propel into said casing an animal initially impelled by either of said means.

CHESTER W. CRUMRINE.

REFERENCES CITED

The following references are of record in the file of this patent:

UNITED STATES PATENTS

| Number | Name | Date |
|---|---|---|
| 224,235 | Shulenbarger | Feb. 3, 1880 |
| 432,493 | Miller | July 15, 1890 |
| 1,048,995 | Morawiecki | Dec. 31, 1912 |
| 1,052,957 | Pryor | Feb. 11, 1913 |
| 1,726,167 | Swint | Aug. 27, 1929 |
| 2,170,470 | Chappell | Aug. 22, 1939 |
| 2,247,931 | Vincent et al. | July 1, 1941 |
| 2,348,729 | Crumrine | May 16, 1944 |
| 2,360,651 | Crumrine | Oct. 17, 1944 |